United States Patent
Lu (10) Patent No.: US 10,824,242 B2
(45) Date of Patent: Nov. 3, 2020

(54) METHOD FOR OPERATING ELECTRONIC DEVICE, ELECTRONIC DEVICE AND COMPUTER-READABLE RECORDING MEDIUM THEREOF

(71) Applicant: HTC Corporation, Taoyuan (TW)

(72) Inventor: Yen-Liang Lu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 49 days.

(21) Appl. No.: 15/725,298

(22) Filed: Oct. 5, 2017

(65) Prior Publication Data
US 2019/0107899 A1    Apr. 11, 2019

(51) Int. Cl.
| | | |
|---|---|---|
| G06F 3/02 | (2006.01) | |
| G06F 1/16 | (2006.01) | |
| G06F 3/0487 | (2013.01) | |
| G06F 3/0354 | (2013.01) | |

(52) U.S. Cl.
CPC .......... G06F 3/0227 (2013.01); G06F 1/1684 (2013.01); G06F 3/03547 (2013.01); G06F 3/0487 (2013.01); G06F 2203/0339 (2013.01)

(58) Field of Classification Search
None
See application file for complete search history.

(56) References Cited

U.S. PATENT DOCUMENTS

| 8,478,349 | B2 | 7/2013 | Seo et al. |
| 2010/0007618 | A1 | 1/2010 | Park et al. |
| 2011/0069024 | A1* | 3/2011 | Kim ............ G06F 3/01 345/173 |
| 2011/0291945 | A1* | 12/2011 | Ewing, Jr. ....... G06F 1/1686 345/173 |

(Continued)

FOREIGN PATENT DOCUMENTS

| CN | 102498674 | 6/2012 |
| CN | 103793160 | 5/2014 |

(Continued)

OTHER PUBLICATIONS

Office Action of Europe Counterpart Application, dated May 11, 2018, pp. 1-7.

(Continued)

*Primary Examiner* — Amare Mengistu
*Assistant Examiner* — Sarvesh J Nadkarni
(74) *Attorney, Agent, or Firm* — JCIPRNET (57) ABSTRACT

The disclosure provided an operating method and an electronic device thereof. The electronic device is configured to predict user's next action and automatically launching or starting an application program without user's input. The electronic device detects an occurrence of a clamping action based on sensor data obtained from at least one sensor on one side of the electronic device. Upon detection of a constant pressure through the sensor data, the electronic device executes a first triggering operation (clamping action) and not execute a second triggering operation (squeeze action). Further, a clamping pattern corresponding to the clamping action is identified based on the sensor data outputted by the at least one sensor. Then, the electronic device automatically launches or starts an application program associated to the identified clamping pattern without user's input through a touch display.

18 Claims, 6 Drawing Sheets receiving sensor data from at least one sensor disposed on a side of a body of electronic device — S610

Identifying a first triggering operation and a second triggering operation based on the received sensor data — S620

Executing the first triggering operation and not execute the second triggering operation when determined that a pressure applied on the at least one side of the body remains within a predetermined range for a predetermined period of time — S630

Identifying a clamping pattern based on the sensor data — S640

Comparing the identified clamping pattern to a predetermined pattern predefined as a corresponding pattern for a first function — S650

Performing a first function based on the comparison result — S660

(56) References Cited

U.S. PATENT DOCUMENTS

| | | | |
|---|---|---|---|
| 2013/0300668 A1* | 11/2013 | Churikov | G06F 3/041 |
| | | | 345/168 |
| 2014/0123003 A1 | 5/2014 | Song | |
| 2014/0375582 A1 | 12/2014 | Park et al. | |
| 2015/0160770 A1 | 6/2015 | Stewart et al. | |
| 2015/0205400 A1 | 7/2015 | Hwang et al. | |

FOREIGN PATENT DOCUMENTS

| | | |
|---|---|---|
| CN | 104850261 | 8/2015 |
| CN | 104898926 | 9/2015 |
| CN | 105094593 | 11/2015 |
| CN | 105892886 | 8/2016 |
| EP | 2816442 | 12/2014 |
| TW | 201224879 | 6/2012 |
| TW | 201426519 | 7/2014 |
| TW | I524243 | 3/2016 |

OTHER PUBLICATIONS

"Office Action of Taiwan Counterpart Application", dated Sep. 20, 2018, p. 1-p. 6.
"Office Action of China Counterpart Application", dated Mar. 4, 2020, p. 1-p. 7.

* cited by examiner

METHOD FOR OPERATING ELECTRONIC DEVICE, ELECTRONIC DEVICE AND COMPUTER-READABLE RECORDING MEDIUM THEREOF

BACKGROUND

Technical Field

The invention relates a method for operating an electronic device, an electronic device, and a computer-readable recording medium thereof, and more particularly, relates to an electronic device being operated through sensors disposed on the sides of the electronic device.

Description of Related Art

Nowadays, electronic devices such as mobile phone, tablet PC and the like are popular and being used in all kind of occasions. For example, one may use the electronic device while driving for navigation, music playing, video recording, etc. Various methods have been developed for operating the electronic device by developers, for examples, touch operations, hand gesture, voice recognition, etc. One would give a commend via touch operation or voice to launch an application program installed on the electronic device as to perform a functional operation.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The disclosure is directed to an operating method, an electronic device and a computer-readable recording medium for automatically launching or starting an application program based on sensor data of sensors disposed on at least one side of the electronic device.

In one of the exemplary embodiments, an electronic device is provided. The electronic device includes a body, at least one sensor and a processor. The at least one sensor is disposed on one side of the body. The processor is coupled to the at least one sensors to receive a sensor data. The processor is configured to identify a first triggering operation and a second triggering operation based on the received sensor data. When determined that a pressure applied on the at least one side of the body remains within a predetermined range for a predetermined period of time, the processor is configured to execute the first triggering operation and not execute the second triggering operation when determined, wherein the first triggering operation is a clamping action, and the second triggering operation is associated to a squeeze action. In response to the first triggering operation, the processor performs a first function (or start an application program).

According to one of the exemplary embodiments, in response to the first triggering operation, the processor is further configured to identify a clamping pattern based on the sensor data, compare the identified clamping pattern to a predetermined pattern predefined as a corresponding pattern for a first function, and perform the first function based on the comparison result.

According to one of the exemplary embodiments, the at least one sensor includes a first sensor disposed on a first side of the body and a second sensor disposed on a second side of the body opposite to the first side. In response to the first triggering operation, the processor is further configured to identify a clamping pattern based on the sensor data, compare the identified clamping pattern to a predetermined pattern predefined as a corresponding pattern for a first function, and perform the first function based on the comparison result.

According to one of the exemplary embodiments, the processor further incorporates information regarding to the status of the display (on or off) for determining a function or application program to perform.

According to one of the exemplary embodiments, the processor further incorporates information regarding to an accelerometer for determining a function or application program to perform.

In one of the exemplary embodiments, a method for operating an electronic device is provided, where the electronic device includes at least one sensor disposed on one side of the electronic device, and the method includes the following steps. Sensor data is obtained from the at least one sensor. A first triggering operation and a second triggering operation is identified based on the obtained sensor data. The first triggering operation and not executing the second triggering operation is executed when, determined, based on the sensor data, that a pressure applied on the side of the body remains within a constant range for a predetermined period of time.

In one of exemplary embodiments, the computer-readable recording medium records computer program to be loaded into a processor in an electronic device to execute the steps of the aforementioned method.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

A novel method for operating an electronic device is provided. In the various exemplary embodiments, outputs from at least one sensor disposed on a side of the electronic device, which are also referred to edge sensor, is utilized for triggering functional operations of the electronic device. Through the outputs obtained from the edge sensor, the electronic device predicts user's next desired operation and automatically perform a function by launching or starting an application program installed on the electronic device. Exemplary embodiments are described below to illustrate an electronic device having the edge sensors and operation of the electronic device through the edge sensors.

Figure 1A:
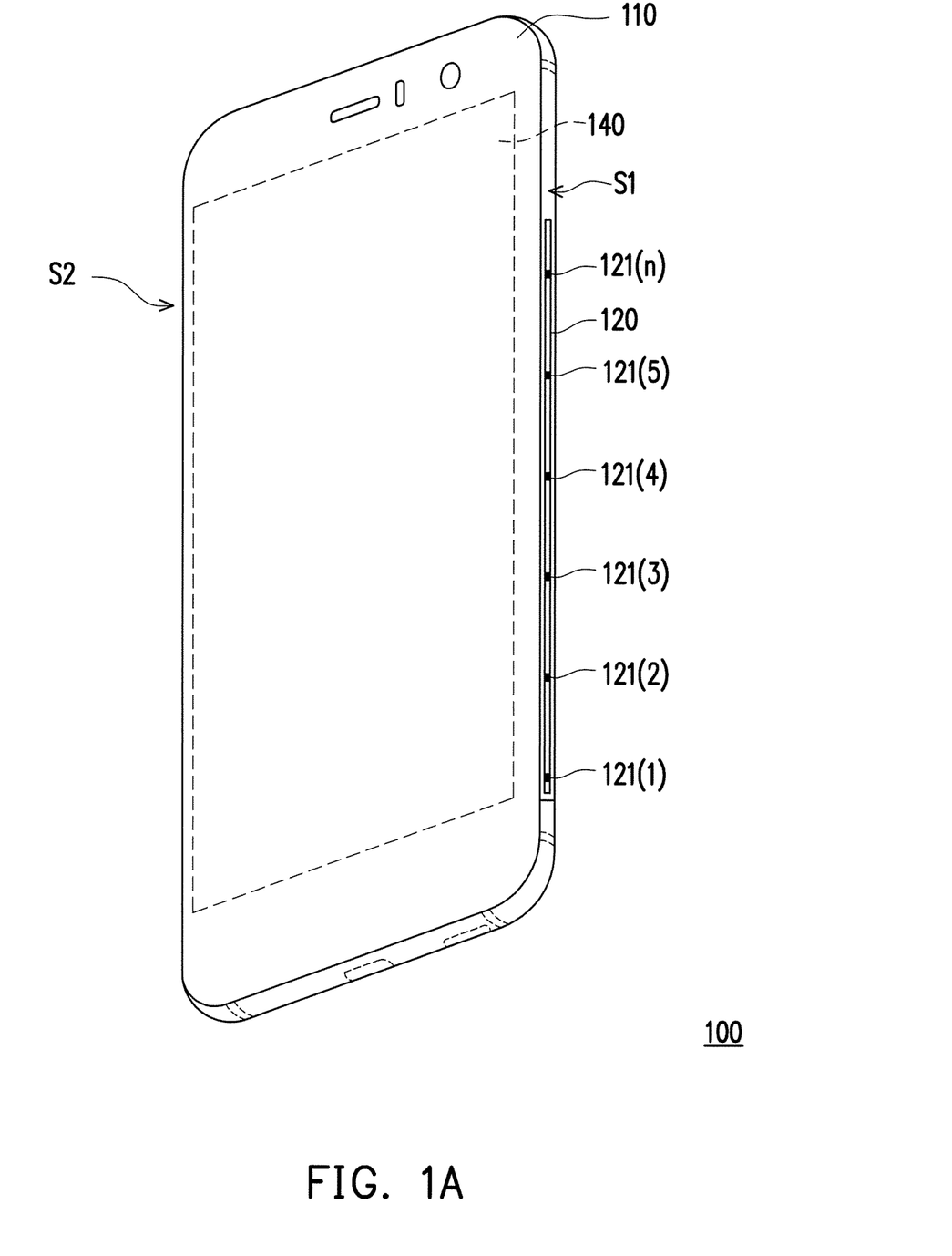
FIGS. 1A and 1B are a diagram illustrating an electronic device according to one of the exemplary embodiments of the disclosure.
Figure 1B:
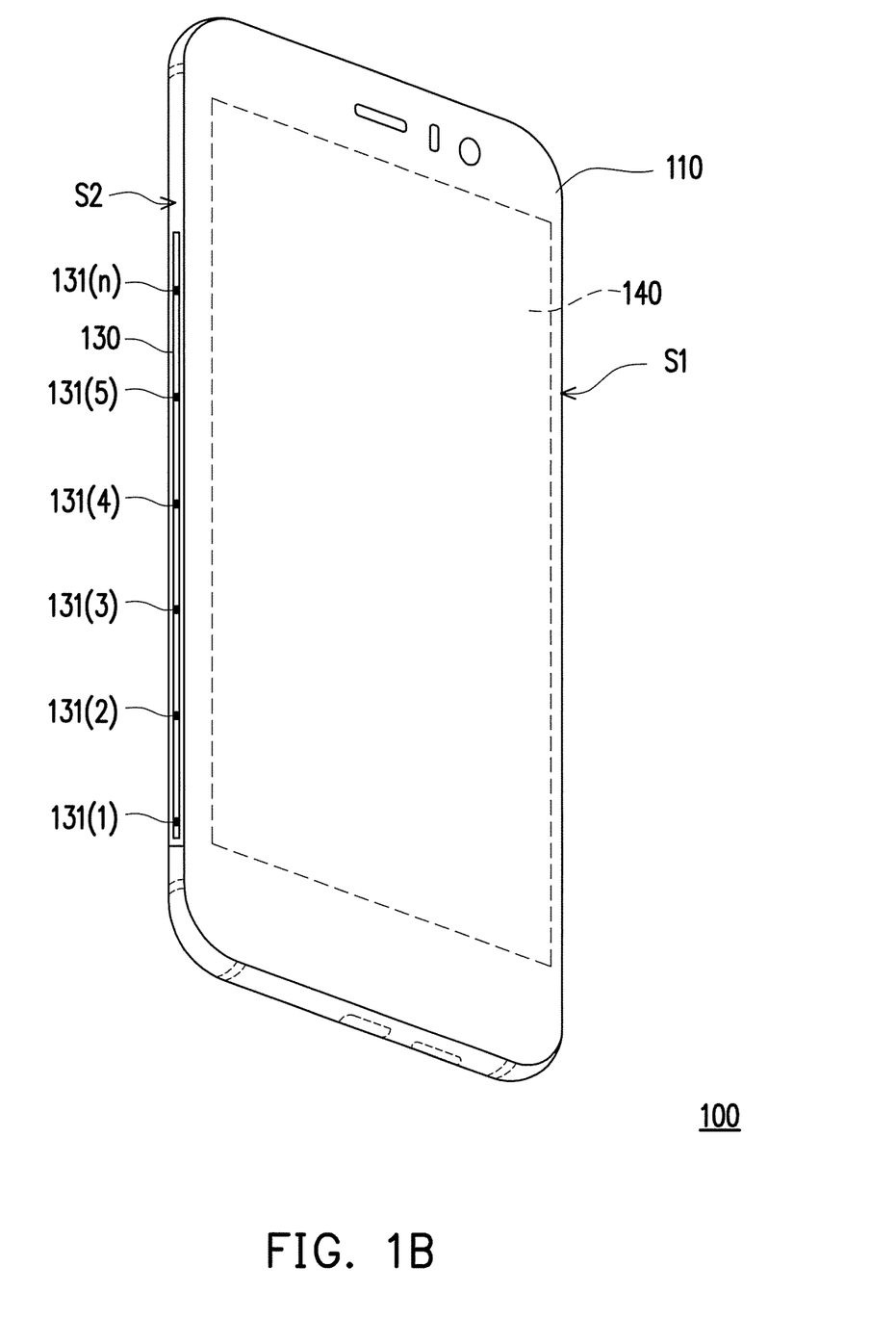

FIGS. 1A and 1B are a diagram illustrating an electronic device 100 according to one of the exemplary embodiments of the disclosure. With reference to FIGS. 1A and 1B, the electronic device includes a body 110, a first sensor 120, and a second sensor 130. The body 110 includes a first side S1 and a second side S2, where the first side S1 is opposite to the second side S2. The first sensor 120 is disposed on the first side S1 of the body 110, and the second sensor 130 is disposed on the second side of the side S2. However, the exemplary embodiment is not intended to limit the location of the first and second sensors 120, 130. In other embodiments, the first and second sensors 120, 130 may be disposed on any sides of the electronic device 100, respectively.

Figure 2:
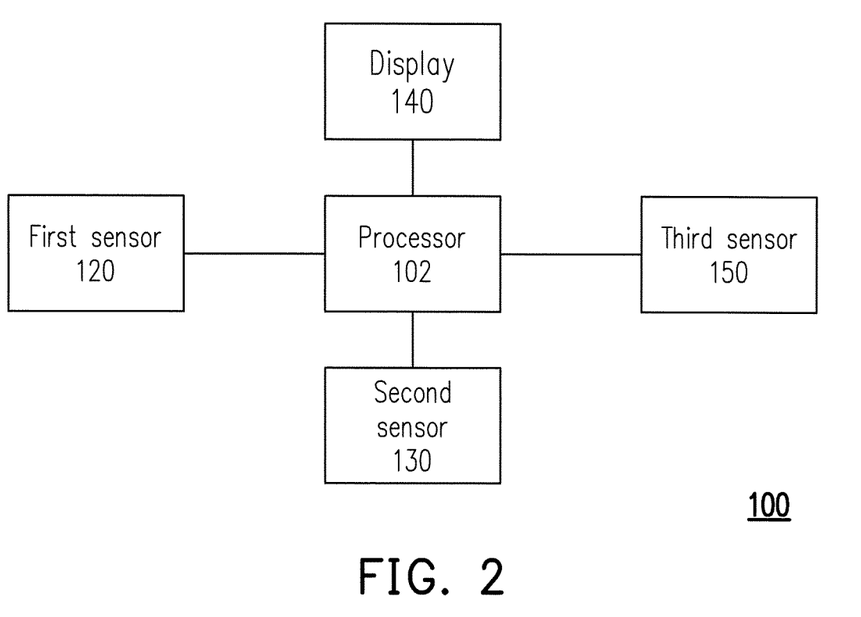
FIG. 2 is a block diagram illustrating an electronic device according to one of the exemplary embodiment of the disclosure.

FIG. 2 is a block diagram illustrating an electronic device according to one of the exemplary embodiment of the disclosure. With reference to FIG. 2, the electronic device 100 further includes a processor 102, where the processor 102 is coupled to the first sensor 120 to receive a first sensor data and the second sensor 130 to receive a second sensor data. The processor 102 may include one or more processor(s) having generic characteristics similar to general purpose processor, such as a central processor (CPU), or may be application specific integrated circuitry (ASIC) that provides arithmetic and control functions to the electronic device 100. In some exemplary embodiments, the processor 102 may be implemented by executing instructions loaded from a memory (not shown), or logic circuits programmed to provide arithmetic operations. In some exemplary embodiments, the processor 102 may be a microprocessor and a digital signal processor (DSP), a programmable controller, a programmable logic device (PLD), other similar devices or a combination of aforementioned devices, where the processor 102 is programmed to execute the functions or steps that would be described below.

In some exemplary embodiments, the electronic device may also include a display 140. The display 140 may include display function and touch sensing function, where the display 140 may be integrated with touch sensors. The touch sensors may be resistive touch sensor, capacitive touch sensor, optic touch sensor or the likes and configured to receive touch operations of fingers, palms, stylus or other objects.

The first sensor 120 and the second sensor 130 may cover a portion or entire side of the body 110 of the electronic device 100 and function to detect the presence of objects (e.g., finger, or clamp) being placed on the first and second side S1, S2 of the electronic device 100, where the position of the object along the first and second side S1, S2 and force or pressure applied by the objects along the first and second side S1, S2 of the body 110 may be determined, respectively. In the exemplary embodiments, the first and sensor 120, 130 may be capacitive sensor, resistive sensor, optical sensor, piezoelectric sensor, or other type of pressure sensors.

In some exemplary embodiments, the first sensor 120 and the second sensor 130 each may include a plurality of sensing elements 121(1)-121($n$), 131(1)-131($n$) that are arranged in an extending direction of the first side S1 or the second side S2 of the body 110 starting from a bottom side of the electronic device 100. The disclosure is not intended to limit the number of the sensing elements 121(1)-121($n$) being disposed on the first or second side S1, S2 for different types of sensor would require different number of sensing elements for detecting a force being applied thereupon. For example, the capacitive and resistive sensors may require denser distribution of the sensing elements along the first and second sides S1, S2 of the body 110 as to detect a dimension of the touch area, where the applied force may be determined by the touch area. That is, as the touch area increase, the processor 102 may determine that a greater force is being applied as compared to a small touch area. In other exemplary embodiments, the first and second sensors 120, 130 may be implemented by piezoelectric sensor. The piezoelectric sensor is configured to sense pressure being applied in a specific direction through acoustic property or other physical properties. For example, one of the piezoelectric sensors may convert the detected acoustic energy and convert it into electrical signal, where the processor 102 may determine the force or pressure being applied based on the noise generated by an action of a griping, holding, clamping, etc. The disclosure is not intended to limit the type of the sensors for various type of the sensors may be implemented to obtain information as to embody the exemplary embodiments.

With reference to FIG. 1, the sensing elements 121(1)-121($n$) may be evenly distributed along the first side S1 of the body 110. The sensing elements 131(1)-131($n$) may be evenly distributed along second side S2 of the body 110. In one of the exemplary embodiment, the sensing elements 121(1)-121($n$) and 131(1)-121($n$) are further arranged symmetrically in position between the first and second sides S1, S2 of the body 110. For example, the sensing elements 121(1) may be positioned along the first side S1 at a similar height (or a distance starting from a bottom edge of the body 110) as the sensing element 131(1) along the second side S2.

With reference to FIG. 2, in some exemplary embodiments, the electronic device 100 may also include a third sensor 150. The third sensor 150 may be a g-sensor, a magnetic sensor, an accelerator, or other sensors that provide information regarding to a heading direction of the electronic device 100. In the exemplary embodiments, sensor data outputted from the third sensor 150 may be utilized by the processor 102 to determine an orientation of the electronic device 100 (landscape or portrait). The sensor data output by the third sensor 150 may be a direction or an acceleration information toward a particular direction. Based the provided direction, the processor 102 may determine the orientation of the electronic device 100 based on the provided (heading) direction.

In the following, an operating method of the electronic device as to automatically perform a function based on the sensor based on the sensor data obtained from at least one of the first and second sensors 120, 130 is described in detail. The process would be described in conjunction with the hardware components illustrated in FIGS. 1 and 2.

As described above, the electronic device 100 detects the presence of objects on the first side S1 or the second side S2 of the body 110 through the outputs of the first sensor 120 and the second sensor 130. When objects are detected on both of the first and second sides S1, S2, such situation may be referred to as a grip action. In other words, the electronic device 110 is being held by user's hand or by a holder (also referred to as stand).

In one of the exemplary embodiments, the electronic device may differentiate a clamping action from a squeeze action based on the sensor data, so as to accurately trigger a desired function of the electronic device 100. The clamping action refers to a grip action performed by a holder, a stand, etc. The processor 102 would identify a pattern of the sensor data corresponding to the clamping action as a first triggering operation. The squeeze action refers to a grip action performed by user's hand, where the user may intentionally apply pressure to trigger various functions of the electronic device 100, or it may be a normal grip or holding of the electronic device 100. The processor 102 may identify a pattern of the sensor data corresponding to the squeeze action as a second triggering operation.

Figure 3:
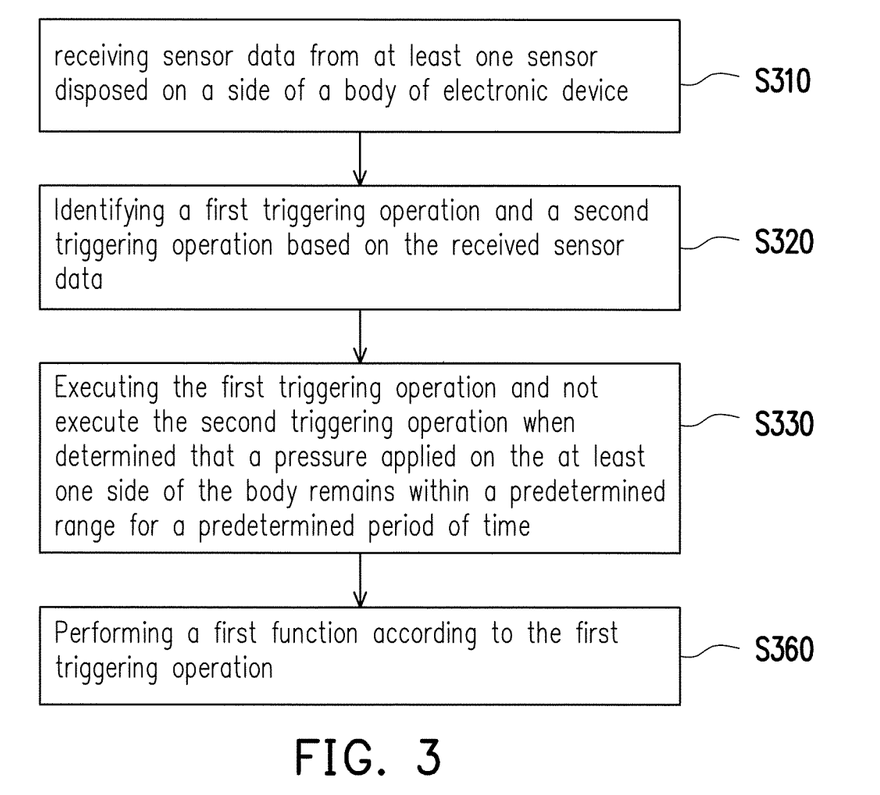
FIG. 3 is a flow diagram illustrating an operation of electronic device according to one of the exemplary embodiments of the disclosure.

FIG. 3 is a flow diagram illustrating an operation of electronic device according to one of the exemplary embodiments of the disclosure. In step S310, sensor data is obtained or received from at least one of the first sensor 120 and the second sensor 130. In step S320, based on a sensor data obtained from at least one sensor (first or second sensor 120, 130), the processor 102 would identify whether a grip action is a clamping action (i.e., first triggering operation) or a squeeze action (i.e., second triggering operation), and then trigger the subsequent corresponding function. It should be noted that the identification of a grip action does not require sensor data from both of the first and second sensors. In one of the exemplary embodiments, sensor data from at least one of the first and second sensors 120, 130 would be sufficient to differentiate a holder grip action from a squeeze action. It should be noted that, in other exemplary embodiments, the electronic device may be equipped with a sensor on one side of the body only, the disclosure is not intended to limit the disposition of the sensor. In the following, the characteristic of the squeeze action would be described first, and then the characteristic of the clamping action.

Figure 4:
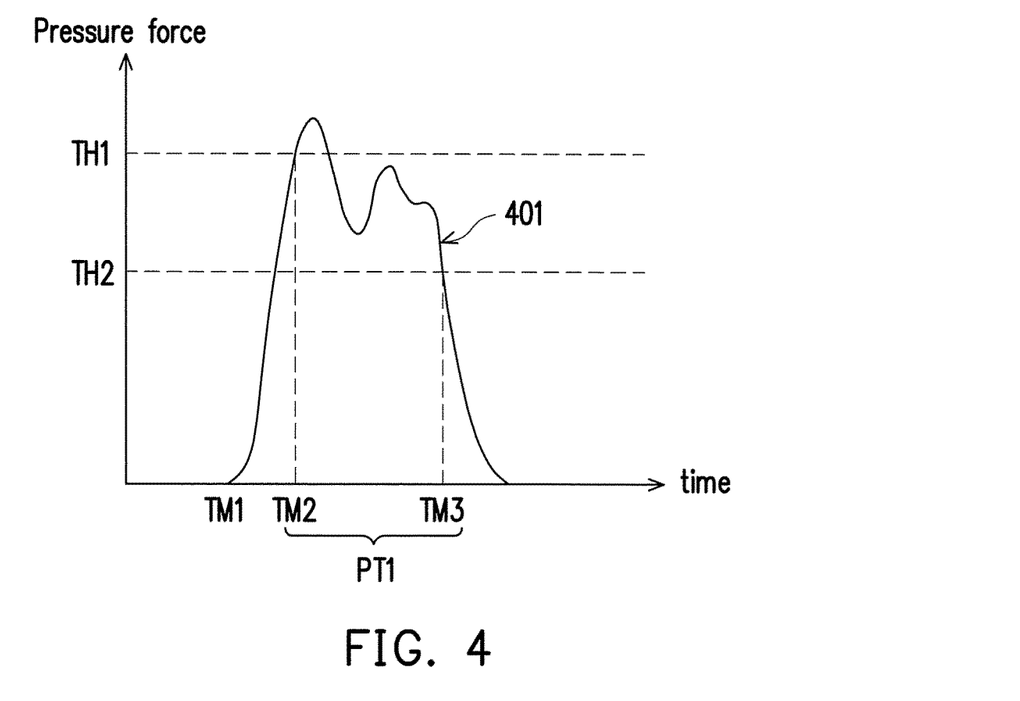
FIG. 4 is a diagram illustrating a pressing pressure of squeeze action according to one of the exemplary embodiments of the disclosure.

FIG. 4 is a diagram illustrating a pressing pressure of squeeze action according to one of the exemplary embodiments of the disclosure. The curve illustrated in FIG. 4 is an example of the pressure measured by any of the first sensor or the second sensor. Since a user may not keep their force in the same level as one holds (or squeeze or grip) the electronic device, the user's force of squeeze action may not be a curve with constant pressure for a period of time. For example, a curve 401 illustrates a pattern of the pressure applied by the squeeze action, which may be a little up and down. In order to improve the successful rate of determining whether the squeeze action is performed, different thresholds for squeezing and releasing are set. For example, referring to FIG. 4, a squeezing threshold TH1 is set for determining if a squeeze action begins (i.e., a second triggering operation), and a releasing threshold TH2 is set for determining if the squeeze action finishes. The releasing threshold TH2 is smaller than the squeezing threshold TH1.

The squeezing threshold TH1 may be set through testing user's squeezing force during a squeezing setting procedure of the portable electronic device 100. The releasing threshold TH2 may be set according to the squeezing threshold TH1. The squeezing setting procedure may comprise asking the user to squeeze the portable electronic device 100, sensing test pressing forces F1 of user's squeezing the portable electronic device 100 with intention to trigger a functional operation of the portable electronic device 100 for several times, and determining a set pressing force F2 to be the squeezing threshold TH1 according to the test pressing forces F1.

The set pressing force F2 may be a percentile value of the test pressing forces F1. For example, in one of the exemplary embodiments, the test pressing forces F1 may be 100, 150, and 200 (pressure units), and the set pressing force F2 (or the squeezing threshold TH1) is 175 (pressure units) being a percentile value of 75th percentile calculated according to the minimum value of 100 (pressure units) and the maximum value of 200 (pressure units). The present disclosure is not limited thereto. In another embodiment, for example, the test pressing forces F1 may be 100, 150, and 200 (pressure units), and the set pressing force F2 (or the squeezing threshold TH1) is 150 (pressure units), being an average value of the three test pressing forces F1.

The releasing threshold TH2 may be determined by the processor 102 according to the squeezing threshold TH1. In an embodiment, the releasing threshold TH2 may be a specific ratio (smaller than 100%) of the squeezing threshold TH1. For example, the value of the releasing threshold TH2 is 75% of the value of the squeezing threshold TH1.

In FIG. 4, a time point TM1 represents a start of a squeeze action upon a detection of pressure on at least one side of the body 110 of the electronic device 100. A time period PT1 between a time point TM2 (corresponding to the squeezing threshold TH1) and a time point TM3 (corresponding to the releasing threshold TH2) may be determined by the processor 102 as a time period of the squeeze action. The squeeze action can be determined by the processor 102 as a long squeeze action or a short squeeze action according to the time period PT1 between the time point TM2 and the time point TM3, comparing to a time threshold (e.g., 0.7s). According to the time period of the squeeze action (the long squeeze action or the short squeeze action), a desired function of the electronic device 100 may be determined by the processor 102 according to the squeeze action.

Figure 5:
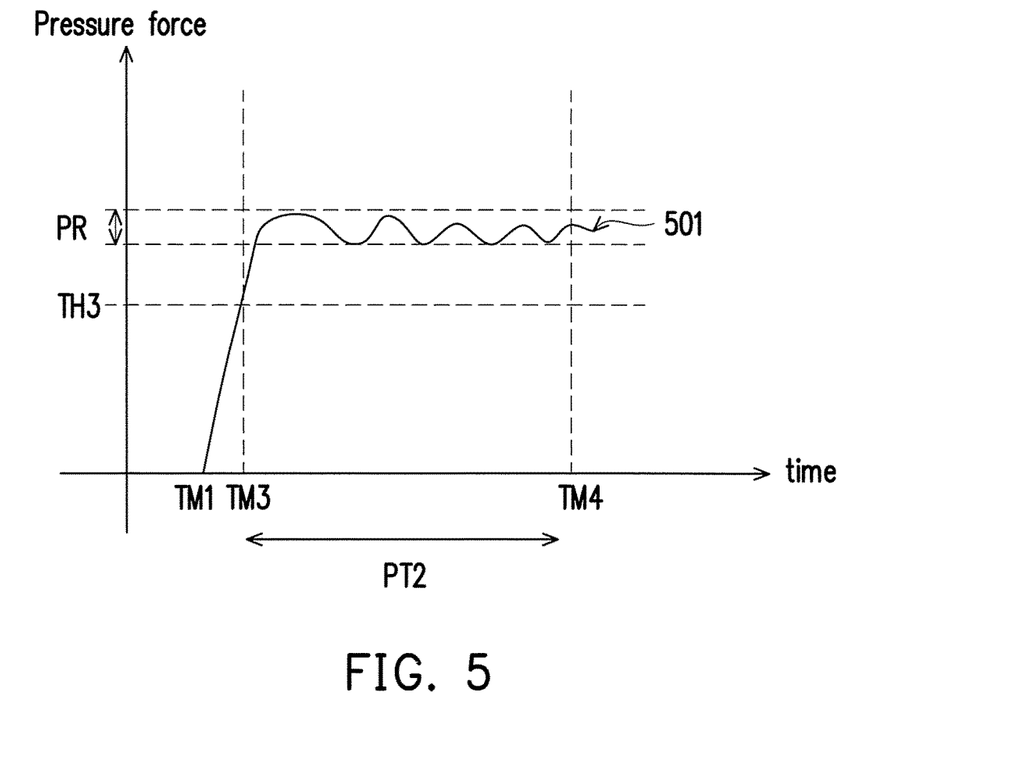
FIG. 5 is a diagram illustrating a pressing pressure of clamping action according to one of the exemplary embodiments of the disclosure.

In the following, the characteristic of the clamping action is described. FIG. 5 is a diagram illustrating a pressing pressure of clamping action according to one of the exemplary embodiments of the disclosure. Different from the squeeze action, a pressure detected by a sensor disposed on a side (or edge) of the electronic device 100 may be a curve that has less variation for a period of time, since a jaw of a holder would apply the same amount of force.

With reference to FIG. 5, a curve 501 is an example of a pressing pressure measured by any of the first sensor or the second sensor while the electronic device 100 is being held by a holder or stand, where the pressing pressure reflects a pressure being applied to the side of the body by the jaws of a holder. In the exemplary embodiment, a clamping threshold TH3 may be set and configured for the processor 102 to determine whether the detected pressure exceed a certain threshold for it to be considered as a clamping action. The exemplary embodiment is not intended to limit the clamping threshold TH3. In other exemplary embodiments, the clamping threshold TH3 may be the same, higher, or lower than the squeezing threshold TH1 or the releasing threshold TH2 as illustrated in FIG. 4.

Similar to FIG. 4, a time point TM1 represents a start of a grip action upon a detection of pressing pressure on at least one side of the body 110 of the electronic device 100. Upon detection of the pressing pressure rising about the clamping threshold TH3 at a time point TM3, data may be sampled for a period of time. For the clamping action, the pattern of the pressing pressure would have less variations, the variations of the pressing pressure would remain within a predetermined range PR that is considered to be stable or constant for a predetermined period of time PT2, which may also be referred to as a constant pressure. The predetermined period of time PT2 is defined to be a period between the time point TM3 to a time point TM4. Therefore, the processor 102 may utilize this characteristic and determine that the electronic device 100 is being held by a holder.

The predetermined period of time PT2 may be 1 us, 5 us, 1 ms, 5 s, or any other amount of time, and the exemplary embodiment is not intended to limit the amount of the sampling time PT2. Furthermore, the predetermined range PR of the pressing pressure may be 2, 5, 20 pressure units, or any other pressure units configured by a user, the exemplary embodiment is not intended to limit the value of the predetermined range PR of the pressing pressure.

It should be noted that the determinations of the grip action depicted in FIGS. 4 and 5 may be performed in parallel or sequentially. One of the differences is that the pressing pressure of the clamping action would remain within a predetermined range PR for a predetermined period of time PT2. For example, the pressing pressure of a clamping action may remain within a certain pressure range for 10 seconds (predetermined period of time PT2), and a difference between max and min peaks of the detected pressing pressure may be within (less or equal to) the predetermined range of the pressure. On the other hand, the pressing pressure of a squeeze action may have variations that would result in a difference between the max and min peaks of the detected pressing pressure to be greater than predetermined range of the pressure.

Based on the above, the processor 102 may differentiate the clamping action from the squeeze action and identifies whether the grip action is a first triggering operation or a second triggering operation. In step S330, the processor 102 executes the first triggering operation which triggers a first function such as a driving mode, map application, etc., and not executing the second triggering operation which triggers a second function corresponding to the squeeze operation, where the first function is different from the second function.

In some exemplary embodiments, it is also necessary to differentiate the clamping action from a normal grip of the electronic device 100. The normal grip may be referred to as a grasp of user's hand. In some situations, the first and second sensors may also sense the presences of objects or pressures when the electronic device is being place is a bag or packet. The differentiation between these grip action and clamping action may be similar above, where the variation of the pressing pressure for a predetermined period of time may be sampled to differentiate the clamping action to the above grip action.

In step S360, the first function would be performed in response to the first triggering operation. As described above, the pressing pressure of a jaw of a holder or stand (clamping action) would remain within a constant pressure for a period of time as compared to other grip actions. Therefore, in the exemplary embodiment, sensor data from at least one sensor disposed on one side of the body would be sufficient to identify that the electronic device is being held by a holder based on the pressing pressure being applied on that side of the electronic device 100.

From other perspective, a clamping action may be referred to a situation where the electronic device 100 is securely held or fastened in a position. For example, the electronic device 100 may be held by a holder or stands having jaws that clamp to the sides of the electronic device 100 (may also referred to as clamping portion). These jaws may apply constant pressure to particular positions on the first side S1 and second side S2 of the electronic device 100, respectively. In other exemplary embodiments, the processor 102 further identifies a clamping pattern based on the received sensor data.

Figure 6:
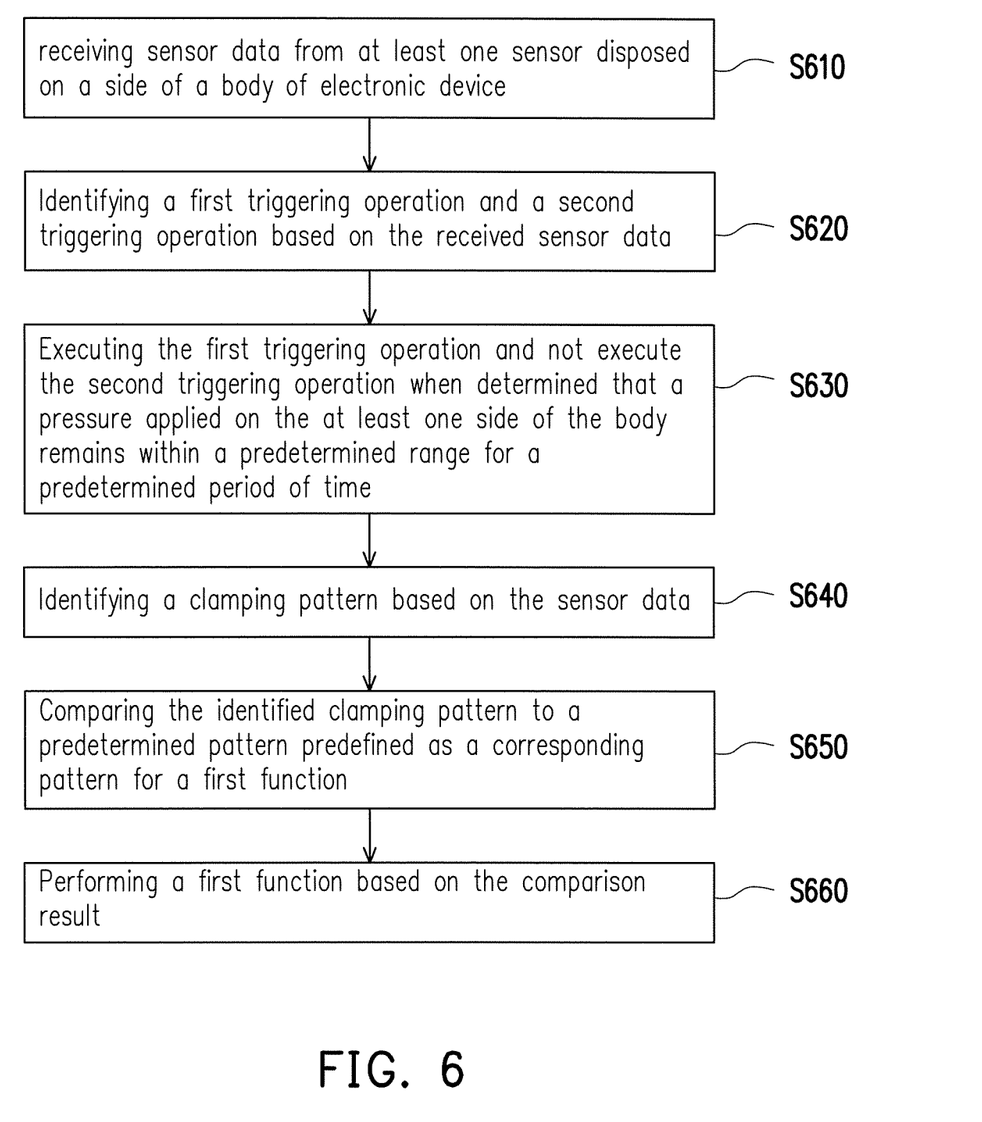
FIG. 6 is a flow diagram illustrating a process of electronic device for executing a function corresponding to a clamping action according to one of the exemplary embodiments of the disclosure.

FIG. 6 is a flow diagram illustrating a process of electronic device for executing a function corresponding to a clamping action according to one of the exemplary embodiments of the disclosure. With reference to FIG. 6, steps S610-S630 are similar to steps S310-S330 illustrated in FIG. 3, respectively, and detail of which are described above. In the exemplary embodiment, the processor 102 further identify a clamping pattern based on the sensor data (step S640). As described above, the sensor data includes various information (e.g., position data, pressure data, etc.) that would allow the processing unit 102 to determine the status of the electronic device. The position of the object may be obtained or estimated through the location of the activated sensing elements of the first and second sensors 120, 130 along the first and second sides S1, S2 of the electronic device 100. For example, the order of the sensing elements may be recorded such as first sensing element of the first side S1, second sensing element of the first side S1, and so on. Alternatively, the position of each sensing elements may be recorded in a mapping table by other means. In some exemplary embodiments, the first sensor data and the second sensor data may each includes position and pressure data representing the pressure that is being applied to each position pressed by the object.

Figure 7:
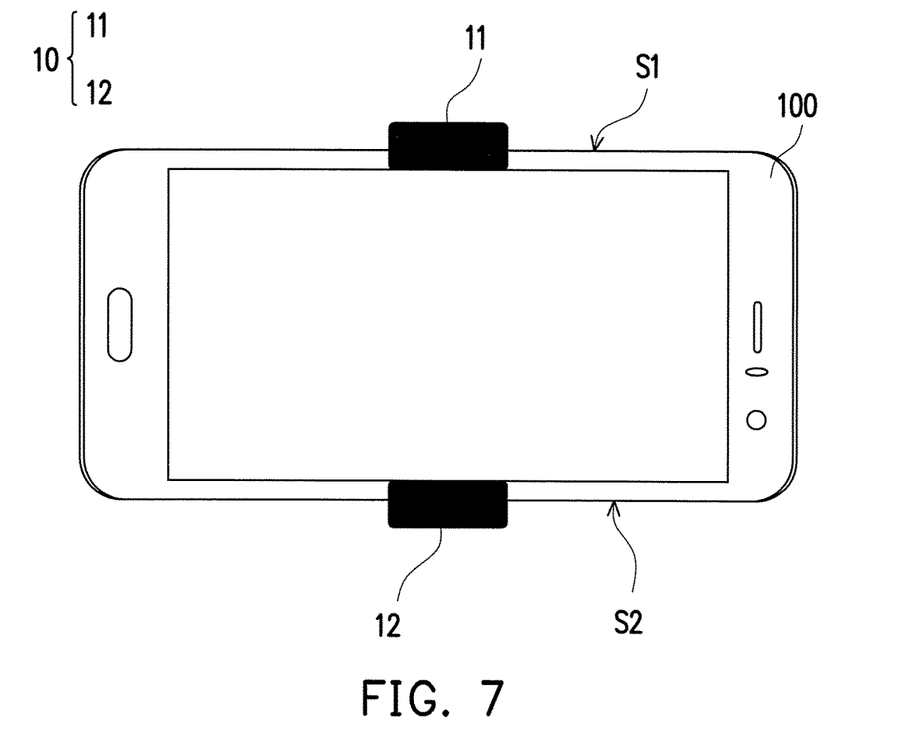
FIG. 7 is a diagram illustrating an electronic device being by a holder according to one of the exemplary embodiment of the disclosure.

FIG. 7 is a diagram illustrating an electronic device being by a holder according to one of the exemplary embodiment of the disclosure. With reference to FIG. 7, the electronic device 100 is held by a holder 10 having a first clamping portion 11 and a second clamping portion 12. The first and second clamping portions 11, 12 of the holder 10 respectively applies pressure inward. The first clamping portion 11 clamps to the electronic device 100 at a first position on the first side S1. The second clamping portion 12 clamps to the electronic device 100 at a second position on the second side S2. The pressure applied through the first and second clamping portions in opposite directions forms a clamping effect that securely holds the electronic device 100 in place. In the exemplary embodiment, the processor 102 identifies the first and second positions on the first and second sides S1, S2 of the electronic device 100 as the clamping pattern that holds the electronic device 100.

Figure 8:
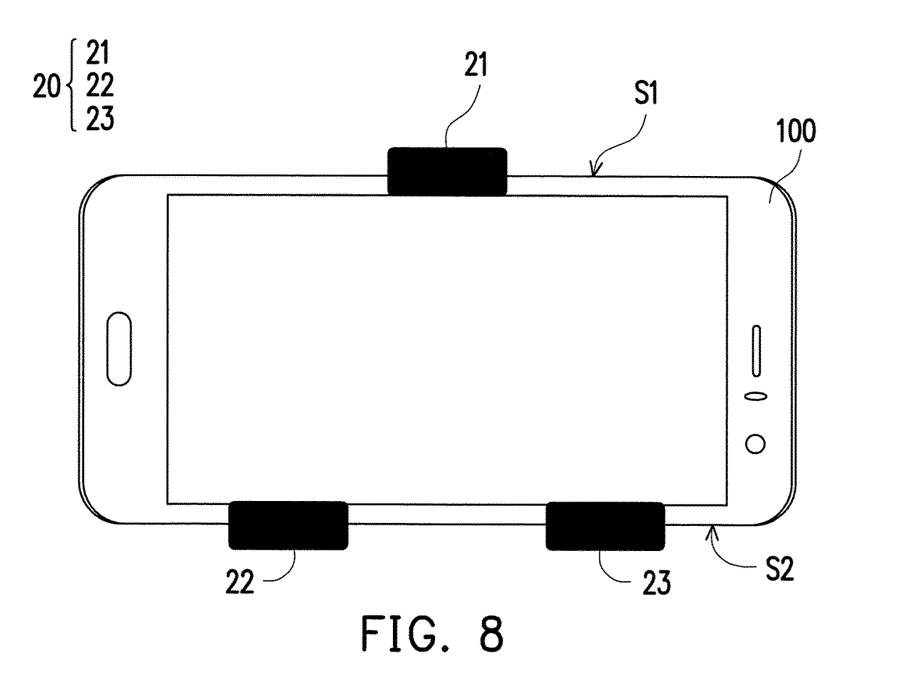
FIG. 8 is a diagram illustrating an electronic device being by a holder according to one of the exemplary embodiment of the disclosure.

FIG. 8 is a diagram illustrating an electronic device being by a holder according to one of the exemplary embodiment of the disclosure. With reference to FIG. 8, the electronic device 100 is held by a holder 20 having a first clamping portion 21, a second clamping portion 22, and a third clamping portion 23. FIG. 8 illustrates that the first clamping portion 21 of the holder 20 clamps to the electronic device 100 at a first position of the first side S1, while the second clamping portion 22 and the third clamping portion 23 respectively clamps to the electronic device 100 at a second portion and a third portion of the second side S2. The processor 102 identifies the first, second, and third positions on the first and second sides S1, S2 as the clamping pattern that holds the electronic device 100. In the exemplary embodiment, the position and the number of clamping portion along each of the first and second sides S1, S2 and the position as the clamping pattern. That is, the clamping pattern illustrated in FIG. 6 is defined by one pressed point on the first side S1, two pressed point on the second side S2, and their respective position on the first and second sides S1, S2.

The holders 10, 20 illustrated above may be a car holder, a bicycle holder, VR helmet, a selfie stands, and the like. Although two and three clamping portions are utilized above to explain the concept of the disclosure, the number of the clamping portions should not be constituted as a limit to the disclosure.

Furthermore, the exemplary embodiments illustrated the electronic device are being held in the landscape orientation, however, the disclosure is not limited thereto. The electronic device may also be oriented in the portrait orientation, and the determination of clamping action and identification of the clamping pattern would be similar as to the process above.

Next, in step S650, the processor 102 compares the identified clamping pattern to a predetermined pattern which is predefined as a corresponding pattern for a first function. In the exemplary embodiment, a plurality of predetermined patterns may be recorded in the electronic device 100, each predetermined pattern may be associated or assigned to a particular function or application program. Then, in step S660, the processor 102 automatically performs a first function based on a comparison between the identified clamping pattern and predetermined patterns performs, or automatically start or launch an application program corresponding to the identified clamping pattern.

For example, a car holder may have clamping portions similar to the exemplary embodiment illustrated in FIG. 7, where one pressed position is sensed on each of the first side S1 and the second side S2. The identified clamping pattern may be registered to be associated with a navigation application program through user's configuration or other means ahead of time. The electronic device 100 may then launch the navigation application program automatically based on the identified clamping pattern.

In other exemplary embodiments, the electronic device 100 may be held by a virtual reality (VR) goggle having three clamping portions similar to the exemplary embodiment illustrated in FIG. 8, or any other clamping patterns. Such clamping pattern may be registered be to associated with a VR application program. Thus, upon a detection of the clamping pattern illustrated in FIG. 8, the processor 102 may automatically launch the VR application program.

In one of the exemplary embodiments, for the identification of the clamping pattern, the processor 102 may further correlate the pressed positions detected on the first and second sides S1, S2 of the electronic device 100. That is, the processor 102 may determine a relationship between each of the pressed positions in distance, and further utilizes the relationship between clamping portions of the holder as one of the parameters to consider for identifying the clamping pattern.

Taking the embodiment illustrated in FIG. 7 as example, the pressed positions corresponding to the clamping portions 11, 12 on the first side S1 and second side S2 may be symmetrical in position. That is, the pressed portion caused by the clamping portion 11 along the first side S1 is measured to be at a distance started from the bottom side of the electronic device as the pressed portion caused by the clamping portion 12 along the second side S2. In this scenario, the processor 102 may consider this symmetrical relationship between the pressed position of the first and second clamping portion 11, 12 as one of the parameters for identifying the clamping pattern (e.g., a symmetrical clamping action).

In some exemplary embodiments, the clamping portions of the VR holder that press the same side of the electronic device 100 may be designed to have a particular distance apart. In some exemplary embodiments, the clamping portion 21 of the holder 20 may not be centered between the clamping portions 22, 23. For example, the clamping portion 21 may be closer to the clamping portion 22. Accordingly, the processor 102 may further differentiate such clamping pattern from other patterns, and launches the corresponding application program.

In some exemplary embodiments, the predetermined pattern may be automatically learned based on the sensor data or predefined by a user. For examples, the processor 102 may automatically learn that a clamping pattern may be defined as predetermined pattern if the first and second sensor data indicate that the pressure applied by the holder on both of the first and second sides of the electronic device remain constant for a period of time. Upon a manual start of an application program by the user, the processor 102 may automatically associate the detected clamping pattern to the manually started application program or display a message on the display to inquire user's feedback. The electronic device 100 may include a memory (not shown) which records the detected clamping pattern.

In one of the exemplary embodiments, in addition to the sensor data obtained from the first and second sensors 120, 130, the processor 102 further considers whether the display 140 is turned on or off upon detection of the clamping action. Upon detection of a constant pressure being applied on one side of the body or a clamping pattern, the processor 102 further determines whether the display is on or off as one of the parameters for determining which function of the electronic device 100 should be performed. For example, the electronic device 100 may be clamped on a car holder. With parameters such as the constant pressure (or clamping pattern) measured from at least one sensor and display being off, the processor 102 may automatically determine that a desire function of the electronic device 100 may be a driving mode application. The driving mode application simplifies the operational interface of the electronic device 100, where icons may be enlarged for easier touch operation, speaker enablement, automatic connection to the car system (e.g., audio or video), or the like. Then, based on the sensor data and status of the display 140, the processor 102 may further discover the intention of the user and automatically performs a second function.

In one of the exemplary embodiments, in addition to the sensor data obtained from the first and second sensors, the processor 102 may further utilize a sensor data obtained from the third sensor 150 (e.g., accelerometer) as an additional parameter for discovering the intention of the user and start a third function. As described above, the third sensor 150 may be an accelerometer which provides acceleration data and heading data. Upon detection of a constant pressure being applied on one side of the body or a camping pattern, the processor 102 further determines an orientation of the electronic device 100 by using the sensor data obtained from the third sensor. For example, a landscape orientation and portrait orientation be configured to indicate that a holder be to a car holder or a bicycle holder. From other perspectives, car and bicycle may use the same holder, however, the orientation of electronic device would be different between car and bicycle. For example, the electronic device 100 may be mounted in the landscape orientation in the car environment, whereas the portrait orientation may be desired in the bicycle environment. Accordingly, with the additional data obtained from the accelerometer, the processor 102 may further define the intention of a user for different environments. In the exemplary embodiment, the operational interface may be different between car and bicycle environments, and thus the function to be perform would be different.

In the above, parameters such as pressing pressure, clamping pattern, status of the display, and orientation of the electronic device are described separately. However, it should be noted that these parameters may be combined in any way for determining a function or application program to start that would better fit the scenario which the electronic device is in.

The disclosure also provides a non-transitory computer readable recording medium, which records computer program to be loaded into a processor disposed in an electronic device to execute the steps of the proposed method. The computer program is composed of a plurality of program instructions (e.g. an organization chart, establishing program instruction, a table approving program instruction, a setting program instruction, and a deployment program instruction). Once the program sections are loaded into the processing device and executed by the same, the steps of the proposed method would be accomplished.

In summary, the exemplary embodiments described above depicted an operating method and an electronic device thereof. The electronic device is configured to predict user's next action and automatically start a function, or launch or start an application program without user's input. The electronic device detects an occurrence of a clamping action based on sensor data obtained from at least one sensor disposed on one side of the electronic device. Upon detection of the clamping action, the electronic device automatically launches or starts a function or an application program for clamping action without user's input through a touch display. Further, clamping pattern corresponding to the clamping action may be identified based on the sensor data obtained from the first and second sensors to further identify the situation of the electronic device, and accordingly, finer determination of a desired function or application program may be achieved.

Exemplary embodiments of the present disclosure may comprise any one or more of the novel features described herein, including in the Detailed Description, and/or shown in the drawings. While the foregoing describes a number of separate embodiments of the apparatus and method of the present disclosure, what has been described herein is merely illustrative of the application of the principles of the present disclosure. For example, as used herein various directional and orientation terms such as "vertical", "horizontal", "bottom", "top", "side", and the like, are used only as relative conventions and not as absolute orientations with respect to a fixed coordinate system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process, application, and/or processor here herein can be implemented using electronic hardware, software consisting of a non-transitory computer-readable medium of program instructions, or a combination of hardware and software. Accordingly, this description is meant to be taken only by way of example, and not to otherwise limit the scope of this invention.

Furthermore, as used herein, "at least one," "one or more" and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together. It is to be noted that the term "a" or "an" entity refers to one or more of that entity. As such, the terms "a" (or "an"), "one or more" and "at least one" can be used interchangeably herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   a body;
   at least one sensor, disposed on at least one side of the body; and
   a processor, coupled to the at least one sensor to receive a sensor data, and configured to:
   determine a difference between a max peak and a min peak of the pressure and a duration of a pressure applied on the at least one side of the body based on the received sensor data;
   determine whether the pressure corresponds to a first triggering operation associated to a clamping action performed by a stand holder or a second triggering operation associated to a squeeze action performed by a user's hand based on the difference between the max peak and the min peak of the pressure and the duration of the pressure, wherein the difference corresponding to the first triggering operation is less than the difference corresponding to the second triggering operation; and
   execute the first triggering operation and not execute the second triggering operation in response to a determination, based on the sensor data, that the difference between the max peak and the min peak of the pressure applied on the at least one side of the body is less than or equal to a predetermined range for a predetermined period of time.

2. The electronic device of claim 1, wherein, in response to the first triggering operation, the processor is further configured to:
   identify a clamping pattern based on the sensor data;
   compare the identified clamping pattern to a predetermined pattern predefined as a corresponding pattern for a first function; and
   perform the first function based on the comparison result.

3. The electronic device of claim 2, wherein the predetermined pattern is identified based on a pressed position detected on the side of the body through the at least one sensor data.

4. The electronic device of claim 2, wherein the at least one sensor comprises a first sensor disposed on a first side of the body and a second sensor disposed on a second side of the body opposite to the first side, and
wherein the processor is further configured to detects a first pressed position corresponding to a grip of an object applied on the first side of the body through the first sensor, and to detect a second pressed position corresponding to a grip of other object applied on the second side of the body through the second sensor.

5. The electronic device of claim 4, wherein the predetermined pattern is a grip pattern that is symmetrical between the first and second sides of the body.

6. The electronic device of claim 4, wherein the clamping pattern is identified based on the number of the first pressed position detected on the first side of the body and the number of the second pressed position detected on the second side of the body.

7. The electronic device of claim 1, wherein the processor is further configured to:
determine whether a display of the electronic device is off in response to the first triggering operation; and
perform a second function in response to a determination that the display is off.

8. The electronic device of claim 1, wherein the first sensor or second sensor is at least one of capacitive sensor, resistive sensor, optical sensor, piezoelectric sensor, or a combination thereof,
wherein the first sensor comprising a plurality of sensing elements arranged along the first side of the body, and the second sensor comprising a plurality of sensing elements arranged along the second side of the body, and
wherein the processor detects the occurrence of the first triggering operation in response to a determination that the pressure obtained from the first and second sensors exceeds a predetermined threshold for a period of time.

9. The electronic device of claim 1, further comprising:
a third sensor, coupled to the processor, and configured to output other sensor data,
wherein the processor is further configured to determine an orientation of the electronic device based on a third sensor data received from the third sensor in response to the first triggering operation, and perform a third function based on the determined orientation.

10. A method for operating an electronic device, wherein the electronic device comprises a body, at least one sensor disposed on a side of the body, comprising:
obtaining a sensor data;
determining a difference between a max peak and a min peak of the pressure and a duration of a pressure applied on the at least one side of the body based on the obtained sensor data;
determining whether the pressure corresponds to a first triggering operation associated to a clamping action performed by a stand holder or a second triggering operation associated to a squeeze action performed by a user's hand based on the difference between the max peak and the min peak of the pressure and the duration of the pressure, wherein the difference corresponding to the first triggering operation is less than the difference corresponding to the second triggering operation; and
executing the first triggering operation and not executing the second triggering operation in response to a determination, based on the sensor data, that the difference between the max peak and the min peak of the pressure applied on the side of the body is less than or equal to a constant range for a predetermined period of time.

11. The method of claim 10, wherein, in response to the first triggering operation, the method further comprising:
identifying a clamping pattern based on the sensor data;
comparing the identified clamping pattern to a predetermined pattern predefined as a corresponding pattern for a function;
performing a first function based on the comparison result.

12. The method of claim 11, wherein the predetermined pattern is identified based on a pressed position detected on the side of the body through the at least one sensor data.

13. The method of claim 11, wherein the at least one sensor comprises a first sensor disposed on a first side of the body and a second sensor disposed on a second side of the body opposite to the first side, and wherein the method further comprises:
detecting first pressed position corresponding to a grip of an object applied on the first side of the body through the first sensor; and
detecting a second pressed position corresponding to a grip of other object applied on the second side of the body through the second sensor.

14. The method of claim 13, wherein the predetermined pattern is a grip pattern that is symmetrical between the first and second sides of the body.

15. The method of claim 11, wherein the clamping pattern is identified based on the number of the first pressed positions being applied on the first side of the body and the number of the second pressed positions being applied on the second side of the body.

16. The electronic device of claim 10, furthering comprising:
determining whether a display of the electronic device is off in response to the first triggering operation; and
performing a second function in response to a determination that the display is off.

17. The method of claim 10, further comprising:
determining an orientation of the electronic device based on a sensor data obtained from a third sensor in response to the first triggering operation; and
performing a third function based on the determined orientation.

18. A non-transitory computer readable recording medium, recording a program to be loaded by a processing device in a virtual reality system to execute steps of:
receiving a first sensor data and a second sensor data;
detecting an occurrence of a clamping action by determining a difference between a max peak and a min peak of the pressure and a duration of a pressure applied on at least one side of a body of the virtual reality system based on the first and second sensor data;
identifying a clamping pattern corresponding to the clamping action by determining whether the pressure corresponds to a first triggering operation associated to a clamping action performed by a stand holder or a second triggering operation associated to a squeeze action performed by a user's hand based on the difference between the max peak and the min peak of the pressure and the duration of the pressure, wherein the difference corresponding to the first triggering operation is less than the difference corresponding to the second triggering operation; and performing a function based on the identified clamping pattern and a predetermined pattern, wherein the difference between the max peak and the min peak of the pressure applied on the at least one side of the body is less than or equal to a predetermined range for a predetermined period of time.

\* \* \* \* \*